June 28, 1960
B. E. KING
2,942,633
POWER SAW GUIDE DEVICE WITH SAW CUT
LOCATOR AND ATTACHING CLAMPS
Filed Oct. 30, 1958
2 Sheets-Sheet 1
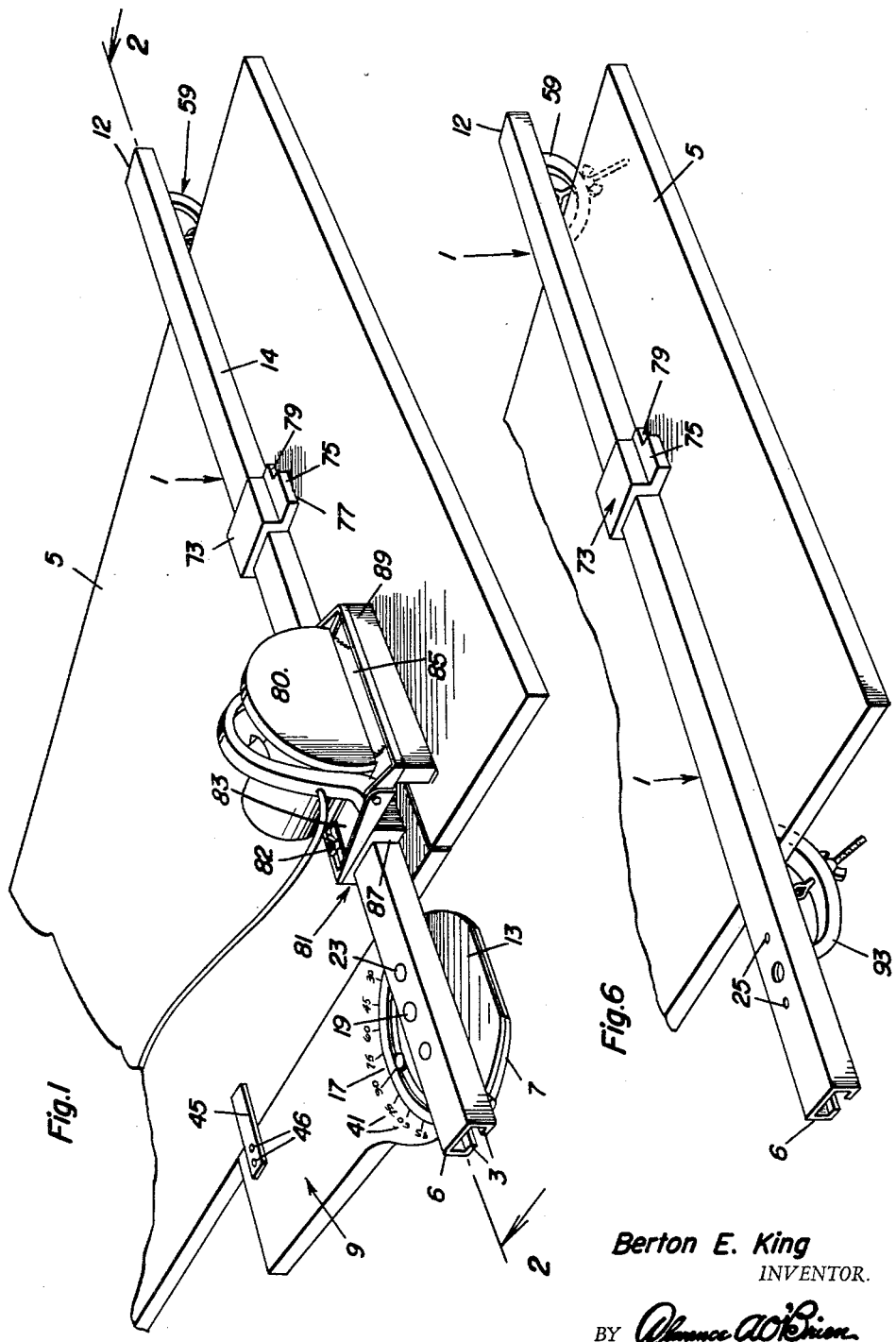
Berton E. King
INVENTOR.

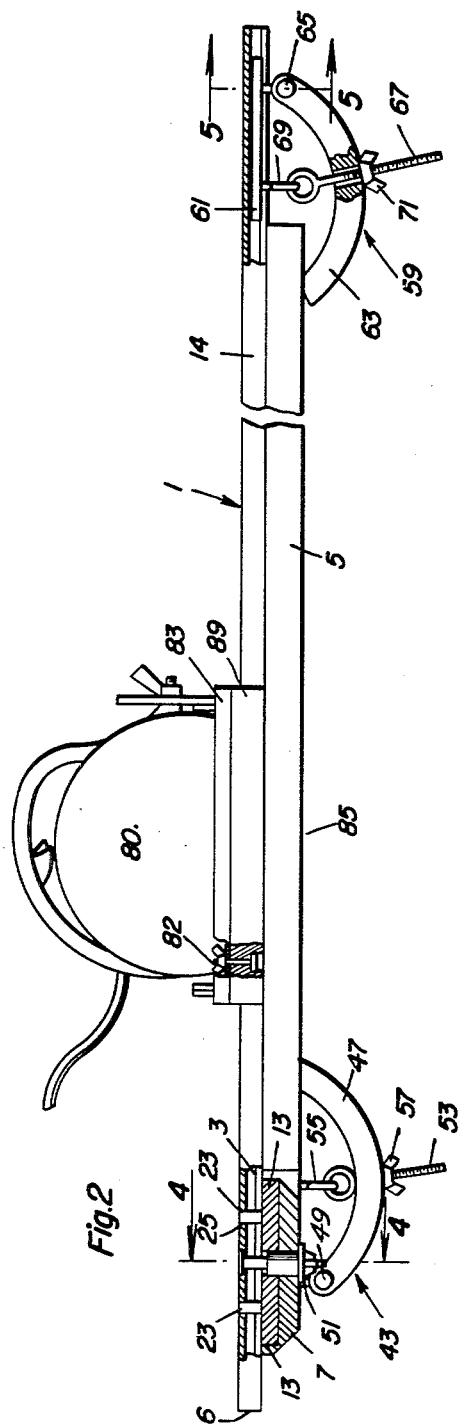

2,942,633
POWER SAW GUIDE DEVICE WITH SAW CUT LOCATOR AND ATTACHING CLAMPS

Berton E. King, 1788 Virginia Way, Arcata, Calif.

Filed Oct. 30, 1958, Ser. No. 770,764

3 Claims. (Cl. 143—6)

This invention relates to improvements in saw guide devices for power saws.

The principal object of the invention is to provide a saw guide device for accurately guiding such a saw across wide veneer, or laminated panels, and the like and which is provided with clamping means for easily and quickly attaching the same to such panels at both side edges of the panels of different widths and is of simple, inexpensive, durable construction; and especially adapted for guiding conventional hand pushed power saws across such panels.

Another object is to provide a saw guide device as in the foregoing which is constructed of parts easily assembled, or disassembled, for storage or carrying in a compact bundle.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a fragmentary view in perspective of the improved saw guide device of this invention applied to a panel;

Figure 2 is an enlarged view partly in side elevation and partly in section taken on the line 2—2 of Figure 1;

Figure 3 is an enlarged fragmentary view in plan, partly in section and broken lines of a saw guiding bar, an index plate, and a mounting plate forming part of the saw guide device;

Figure 4 is an enlarged view in vertical cross-section taken on the line 4—4 of Figure 2;

Figure 5 is an enlarged view in vertical cross-section taken on the line 5—5 of Figure 2, and Figure 6 (Sheet 1) is a perspective view illustrating an optional use of the saw guiding bar.

Referring to the drawings by numerals, the saw guide device of this invention comprises a saw guiding bar 1 of inverted channel form with inturned longitudinal bottom flanges 3 spaced apart for a purpose presently seen. The saw guiding bar 1 is of suitable length to extend across panels, as at 5, of different widths when said saw bar 1 is extended at different angles across a panel 5.

The saw guiding bar 1 is pivotally mounted adjacent a rear end 6 thereof, by means presently described, on the front end 7 of an elongated mounting plate 9 for swinging on said plate 9 into selected angular positions over the panel 5. The mounting plate 9 extends at an angle from what constitutes the rear side 10 of the saw guiding bar 1 and is provided with a straight edge 11 for slidably engaging one edge of a panel 5 to guidingly position said saw guiding bar 1 laterally into a selected position along said panel over which the saw guiding bar is slidable laterally.

For pivotally mounting the saw guiding bar 1 on the mounting plate 9, the following means is provided. A substantially circular index plate 13 supports the saw guiding bar 1 which extends diametrically thereacross. The index plate 13 is rotatably seated flush with the mounting plate 9 in a countersink 15 in the front end 7 of said plate 13 and against a semi-circular shoulder 17 at one side of the countersink 15 and at the rear side 10 (Figure 4) of said bar 1.

A pivot bolt 19 extends through the saw guiding bar 1 in the horizontal center of said bar and through a bushing 21 extending through the index plate 13 in the axis thereof and through the front end 7 of the mounting plate 9. A pair of upstanding studs 23 on the index plate 13 at opposite sides of the bolt 19 extends through openings 25 in the top of the saw guiding bar 1 adjacent the rear end 6 of bar 1. Thus swinging of the saw guiding bar 1 into different angular positions will correspondingly rotate the index plate 13. The pivot bolt 19 has its head 27 countersunk in the top of the saw guiding bar 1 for a purpose presently apparent. A washer 29 and a wing nut 31 on the lower end of the pivot bolt 19 provide for removably securing the bolt 19 in place and the index plate 13 and saw guiding bar detachably on the mounting plate 9. As will be seen, by removing the pivot bolt 19, the saw guiding bar 1 may be lifted off the index plate 13 for detachment therefrom.

The index plate 13 is locked in different angular positions of the same and the saw guiding bar 1 by means of a concentric arcuate slot 33 therein in the rear of said bar 1, and a locking bolt 35 extending through said slot 33 and the front end 7 of the mounting plate 9 and equipped below said end 7 with a wing nut 37. As will be seen, by removing the bolt 35, the index plate 13 may be detached from the mounting plate 9. A radial index mark 39 on the index plate 13 in the rear of the slot 33 registers with an arcuate series of protractor degree graduations 41 on the mounting plate 9 at the shoulder 17 and indicates the angle at which the saw guiding bar 1 is swung.

A clamp 43 is provided on the rear end 8 of the mounting plate 9 to lock said plate and the saw guiding bar 1 in different longitudinal positions on the panel 5 and comprises the following clamping means. An upper elongated, flat jaw 45 (Figure 1) is fixed at one end, as at 46, on top of the mounting plate 9 to project from the straight edge 11 into overlapping and engaging relation to the panel 5. A downwardly bowed arcuate, movable jaw 47 (Figure 2) beneath the jaw 45 is pivoted at one end, as at 49, to a depending bolt 51 on the mounting plate 9 to terminally engage the bottom of the panel 5. A threaded eyebolt 53 swivelled on eyebolt 55 depending from the mounting plate 9 is slidably extended through the movable jaw 47 with a wing nut 57 thereon to tighten the movable jaw 47 and hence the fixed jaw 45 for clamping the panel 5 therebetween at one edge of said panel.

A second clamp 59 is provided on the front end 12 of the saw guiding bar 1 for clamping the other end of said bar 1 to the panel 5 at the other side thereof in differently swung angular positions of said bar 1 and is similar to clamp 43 in that it comprises a relatively fixed jaw bar 61, an arcuately movable jaw 63 pivoted on a bolt 65, a threaded tightening bolt 67 swivelled on an eyebolt 69 with a wing nut 71 thereon all as in the clamp 43. However, in the clamp 59, the jaw bar 61 carries the eyebolts 65, 69 and is longitudinally slidably and removably fitted in the channel of the saw guiding bar 1 to slide on the flanges 3 for adjustment longitudinally of the saw guiding bar 1 to clamp said bar to the panel 5.

A U-shaped saw cut locator member 73 is provided to straddle said saw guiding bar 1 for sliding along the same and is removable therefrom. The saw cut locator member 73 comprises a lateral straight edge flange 75 extending outwardly from the front side 14 of the saw guiding bar 1 and a front corner notch 79 in the flange 75 both for a purpose presently seen.

A saw carriage 81 is provided for a conventional power hand pushed saw 80 having a rectangular base plate 83, and to support such a saw with the blade 85 spaced from the front side 14 of the saw guiding bar 1. The carriage 81 comprises a channel runner bar 87 straddling the saw guiding bar 1 and slidable thereon, and a runner bar 89 spaced forwardly of the front side 14 of the saw guiding bar 1 parallel therewith so that with the base plate 83 of the saw bolted, as at 82 on said runners, or runner bars 87, 89 the saw blade will be spaced from the saw guiding bar 1 and the saw carriage will straddle a saw cut. As will be seen, the saw 80 and carriage 81 are removable from the saw guiding bar 1 and replaceable at will and the saw blade 85 is tiltable laterally, as is conventional for bevel edge cutting.

In using and operating the described device in straight edge cutting, it is placed on the panel 5 with the saw 80, carriage 81, and clamp 59 detached from the saw guiding bar 1. With the straight edge 11 of the mounting plate 9 engaged with one edge of the panel 5, the device is slid along the panel 5 longitudinally thereof into saw cutting location and the saw guiding bar 1, with the bolt 35 loosened, is swung into the desired angular position as indicated by the mark 39 and graduations 41, and the bolt 35 is then tightened to lock said saw guiding bar 1 to the mounting plate 9 in set position. The saw cutting location is established in straight edge cutting by registering the straight edge of the saw cut locator flange 75 with a mark 77 or the like on the panel 5. In bevel edge cutting the inner edge of the notch 79 is registered with such a mark or the like because of lateral tilting of the saw blade 85 whereby the upper edge of a bevel cut is closer to the saw guiding bar 1. The clamp 43 is then tightened to lock the mounting plate 9 to the panel 5 at one side of the panel and the clamp 59 is then slid into the saw guiding bar 1 and clampingly engaged with the panel 5 at the other side thereof in a manner which will be clear and whereby to lock the front end 7 of the saw guiding bar 1 to said panel. The saw cut locator member 73 may then be detached and the saw carriage 81 with the saw 80 thereon attached to the saw guiding bar 1 at the front end 6 of the saw guiding bar 1 so that said saw may be manually pushed along the saw guiding bar 1 and over panel 5 to cut in the saw cutting location established as above described.

Optionally, as shown in Figure 6, the saw guiding bar 1 and the saw cut locator member 73 may be used alone without the mounting plate 9 and the index plate 13 on a panel with the front end 12 of the saw guiding bar clamped to the panel 5 by the clamp 59 and the rear end 6 of the saw guiding bar clamped to the panel 5 at the side of the panel opposite the clamp 59 by another clamp 93 like the clamp 59. As will be obvious, the saw cut locator member 73 and the clamps 59, 93 may be used with various bars, like the saw guiding bar 1 but longer to extend across panels 5 of exceptional widths.

The manner in which the parts of the described device may be detached and assembled in compact arrangement for storage, or attached together for use will, it is believed, be obvious without further explanation.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly all suitable modifications and equivalents may be resorted to, falling within the scope of the invention as claimed.

What is claimed as new is as follows:

1. A saw guide device comprising a saw guiding bar of downwardly opening channel shape for extending across a piece of work, a U-shaped saw cut locator member straddling said bar and having a lateral straight edge flange and slidable on said bar lengthwise thereof for registration of the straight edge of said flange with a line or mark alongside said bar on the work, a pair of runners for supporting a saw and straddling a saw cut with one runner slidable on said bar and the other runner slidable on the work, a clamping jaw operative for securing the bar to the work and a plate carrying said jaw and slidable in the channel of the bar to position the saw into clamping position to an edge of the work.

2. A saw guide device comprising a saw guiding bar of downwardly opening channel shape for extending across a piece of work, and movement laterally over the same, an elongated mounting plate for said bar slidably engageable with an edge of the work to guide said bar during lateral movement thereof, means attaching one end of said bar on one end of said saw guiding bar for swinging of said bar into angular positions over the work, a U-shaped saw cut locator member straddling said bar and having a lateral straight edge flange and slidable on said bar lengthwise thereof for registration of the straight edge of said flange with a line or mark alongside said bar on the work, and a pair of runners for supporting a saw and straddling a saw cut with one runner slidable on said bar and the other slidable on the work, a clamping jaw operative for securing said bar to the work, a plate carrying said jaw and slidable in the channel of said bar to position the jaw into clamping position to one edge of the work, and a pair of clamping jaws on the other end of said plate for securing said plate to another edge of the work.

3. A saw guide comprising a saw guiding bar of downwardly opening channel shape for extending across a piece of work, means for mounting a saw on said bar for sliding along said bar, a clamping jaw operative for securing the bar to the work, a plate carrying said jaw and slidable in the channel of said bar to position the jaw into clamping position relative to one edge of the work, a U-shaped saw cut locator member straddling said bar and having a lateral straight edge flange and slidable on said bar lengthwise thereof for registration of the straight edge of said flange with a line or mark alongside said bar on the work.

References Cited in the file of this patent

UNITED STATES PATENTS

| | | |
|---|---|---|
| 1,911,045 | Tinnen | May 23, 1933 |
| 2,661,034 | MacDonald | Dec. 1, 1953 |
| 2,708,465 | Huebner et al. | May 17, 1955 |
| 2,773,523 | Hopla | Dec. 11, 1956 |

FOREIGN PATENTS

| | | |
|---|---|---|
| 934,789 | Germany | Nov. 3, 1955 |